United States Patent
Park et al.

(10) Patent No.: US 10,342,095 B2
(45) Date of Patent: Jul. 2, 2019

(54) INPUT VOLTAGE STABILIZATION CIRCUIT FOR REAR COMBINATION LAMP, REAR COMBINATION LAMP, AND VEHICLE

(71) Applicant: LG ELECTRONICS INC., Seoul (KR)

(72) Inventors: Sanghyun Park, Seoul (KR); Hongkwon Kim, Seoul (KR); Sangphil Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/622,942

(22) Filed: Jun. 14, 2017

(65) Prior Publication Data

US 2018/0014376 A1 Jan. 11, 2018

(30) Foreign Application Priority Data

Jun. 14, 2016 (KR) ........................ 10-2016-0073815

(51) Int. Cl.
*B60Q 1/30* (2006.01)
*H05B 33/08* (2006.01)

(52) U.S. Cl.
CPC ........... *H05B 33/0896* (2013.01); *B60Q 1/30* (2013.01); *H05B 33/0827* (2013.01); *Y02B 20/36* (2013.01)

(58) Field of Classification Search
CPC . B60S 1/488; B64C 2201/042; B64C 39/024; H05B 33/0803; H05B 33/0815; H05B 37/0209; H05B 37/0218; H05B 37/0236; H05B 37/0245; H05B 33/0845; H05B 33/0869

USPC ................. 315/291, 112, 158, 294, 309, 312
See application file for complete search history.

(56) References Cited

U.S. PATENT DOCUMENTS

| 7,573,210 B2 | 8/2009 | Ashdown et al. |
| 9,791,110 B2 * | 10/2017 | Hu ........................... F21K 9/64 |
| 2004/0066154 A1 * | 4/2004 | Ito ...................... H05B 33/0815 315/291 |

(Continued)

FOREIGN PATENT DOCUMENTS

| DE | 20004810 | 12/2000 |
| JP | 2007318983 | 12/2007 |

(Continued)

OTHER PUBLICATIONS

Extended European Search Report in European Application No. 17164959.3, dated Nov. 3, 2017, 8 pages (with English translation).

*Primary Examiner* — Wei (Victor) Chan
(74) *Attorney, Agent, or Firm* — Fish & Richardson P.C.

(57) ABSTRACT

An input voltage stabilization circuit for a rear combination lamp includes: an optical output unit including a plurality of Organic Light Emitting Diodes (OLEDs); a voltage converter; and a feedback unit. The voltage converter is configured to supply an output voltage for driving the plurality of OLEDs by converting a first voltage supplied by a vehicle battery to the output voltage, the output voltage being different from the first voltage. The feedback unit is configured to provide, as feedback to the voltage converter, information regarding a maximum voltage value for the plurality of OLEDs. The voltage converter is further configured to adjust the output voltage based on the information provided as feedback by the feedback unit regarding the maximum.

14 Claims, 13 Drawing Sheets

(56) References Cited

U.S. PATENT DOCUMENTS

| | | | |
|---|---|---|---|
| 2005/0179393 A1* | 8/2005 | Murakami | B60Q 11/005 |
| | | | 315/77 |
| 2010/0013395 A1 | 1/2010 | Archibald et al. | |
| 2010/0134040 A1 | 6/2010 | Elder | |
| 2011/0062872 A1 | 3/2011 | Jin et al. | |
| 2011/0279058 A1* | 11/2011 | Dari | H05B 33/0848 |
| | | | 315/294 |
| 2012/0314463 A1 | 12/2012 | Chen | |
| 2014/0320019 A1* | 10/2014 | Smith | H05B 33/0842 |
| | | | 315/130 |
| 2015/0312983 A1* | 10/2015 | Hu | F21K 9/64 |
| | | | 315/186 |
| 2016/0021712 A1* | 1/2016 | Nakamura | H05B 33/0809 |
| | | | 315/82 |
| 2018/0054862 A1* | 2/2018 | Takagimoto | B60Q 1/34 |

FOREIGN PATENT DOCUMENTS

| | | |
|---|---|---|
| JP | 2013065487 | 4/2013 |
| KR | 10-2013-0012670 | 2/2013 |
| KR | 10-2014-0079932 | 6/2014 |
| KR | 10-2015-0121868 | 10/2015 |
| KR | 10-2015-0134174 | 12/2015 |

\* cited by examiner

300

INPUT VOLTAGE STABILIZATION CIRCUIT FOR REAR COMBINATION LAMP, REAR COMBINATION LAMP, AND VEHICLE

CROSS-REFERENCE TO RELATED APPLICATIONS

The present application claims the benefit of an earlier filing date and right of priority to Korean Patent Application No. 10-2016-0073815, filed on Jun. 14, 2016, the content of which is hereby incorporated by reference as if fully set forth herein.

TECHNICAL FIELD

The present disclosure generally relates to an input voltage stabilization circuit for a rear combination lamp in a vehicle.

BACKGROUND

A vehicle is a device that is powered to transport a passenger in a desired direction. An example of a vehicle is a car. To increase the convenience of users, a vehicle is typically equipped with various sensors and electronic devices. For example, some vehicles include an Advanced Driver Assistance System (ADAS), and some vehicles are configured as autonomous vehicles that autonomously perform one or more operations of driving the vehicle.

A vehicle typically includes a plurality of lamps, or lighting devices. As examples, such lamps implement a Light Emitting Diode (LED), a Laser Diode (LD), or the like, as a light source.

SUMMARY

Implementations disclosed herein provide an input voltage stabilization circuit in a rear combination lamp, for supplying a stable voltage to a plurality of Organic Light Emitting Diodes (OLEDs) included in the rear combination lamp.

In one aspect, an input voltage stabilization circuit for a rear combination lamp may include: an optical output unit including a plurality of Organic Light Emitting Diodes (OLEDs); a voltage converter; and a feedback unit. The voltage converter may be configured to supply an output voltage for driving the plurality of OLEDs by converting a first voltage supplied by a vehicle battery to the output voltage, the output voltage being different from the first voltage. The feedback unit may be configured to provide, as feedback to the voltage converter, information regarding a maximum voltage value for the plurality of OLEDs. The voltage converter may be further configured to adjust the output voltage based on the information provided as feedback by the feedback unit regarding the maximum.

In some implementations, the input voltage stabilization circuit may further include a regulator unit including a plurality of regulators individually connected to a respective OLED among the plurality of OLEDs.

In some implementations, the input voltage stabilization circuit may further include a diode AND gate including a plurality of diodes. The plurality of diodes may be individually connected to a respective connection node among a plurality of connection nodes between the plurality of OLEDs and the plurality of regulators.

In some implementations, the diode AND gate may be configured to determine the maximum voltage value for the plurality of OLEDs by determining a maximum voltage among a plurality of voltages applied to the plurality of OLEDs.

In some implementations, the feedback unit may include a voltage division resistor unit configured to: divide a voltage output from the diode AND gate; and output a divided voltage as the information provided as feedback to the voltage converter.

In some implementations, the feedback unit may further include a capacitor unit connected in parallel to the voltage division resistor unit.

In some implementations, the voltage converter may be further configured to adjust the output voltage to maintain, at a reference value, the information provided as feedback to the voltage converter.

In some implementations, the input voltage stabilization circuit may further include a converter protector configured to, upon occurrence of a failure in at least one of the plurality of OLEDs, protect the voltage converter.

In some implementations, the converter protector may include a first output voltage limiter configured to provide, as feedback to the voltage converter, information regarding a limit voltage value for limiting the output voltage.

In some implementations, the converter protector may further include a second output voltage unit configured to provide, as feedback to the voltage converter, the information regarding the limit voltage value based on a plurality of temperatures sensed at a plurality of points of a circuit board.

In some implementations, the second output voltage limiter may include a plurality of Negative Temperature Coefficient (NTC) thermistors arranged at the plurality of points of the circuit board.

In some implementations, the second output voltage limiter may further include a diode AND gate configured to determine a maximum voltage among a plurality of voltages applied to the plurality of NTC thermistors.

In some implementations, the converter protector may further include a diode OR gate configured to select a greater voltage value among a first voltage value output from the first output voltage limiter and a second voltage value output from the second output voltage limiter.

In some implementations, the input voltage stabilization circuit may further include a failure sensing unit configured to sense a failure in at least one of the plurality of OLEDs.

In some implementations, the input voltage stabilization circuit may further include at least one processor configured to control, for each of the plurality of OLEDs, a respective optical output pattern based on a Pulse Width Modulation (PWM) signal.

In some implementations, the input voltage stabilization circuit may further include a power sensing unit configured to sense an abnormal state of a power supply line that supplies power from the vehicle battery.

In some implementations, the input voltage stabilization circuit may further include an emergency power connection unit configured to supply a voltage for providing the PWM signal to the voltage converter.

In another aspect, a rear combination lamp may include the input voltage stabilization circuit according to one or more of the implementations described above.

In some implementations, the rear combination lamp may further include at least one of a brake lamp, a tail lamp, a turn signal lamp, a backup lamp, or a fog lamp that implements the plurality of OLEDs In another aspect, a vehicle may include the rear combination lamp according to one or more of the implementations described above.

It is to be understood that both the foregoing general description and the following detailed description of the present invention are exemplary and explanatory and are intended to provide further explanation of the invention as claimed.

DETAILED DESCRIPTION

Figure 1:
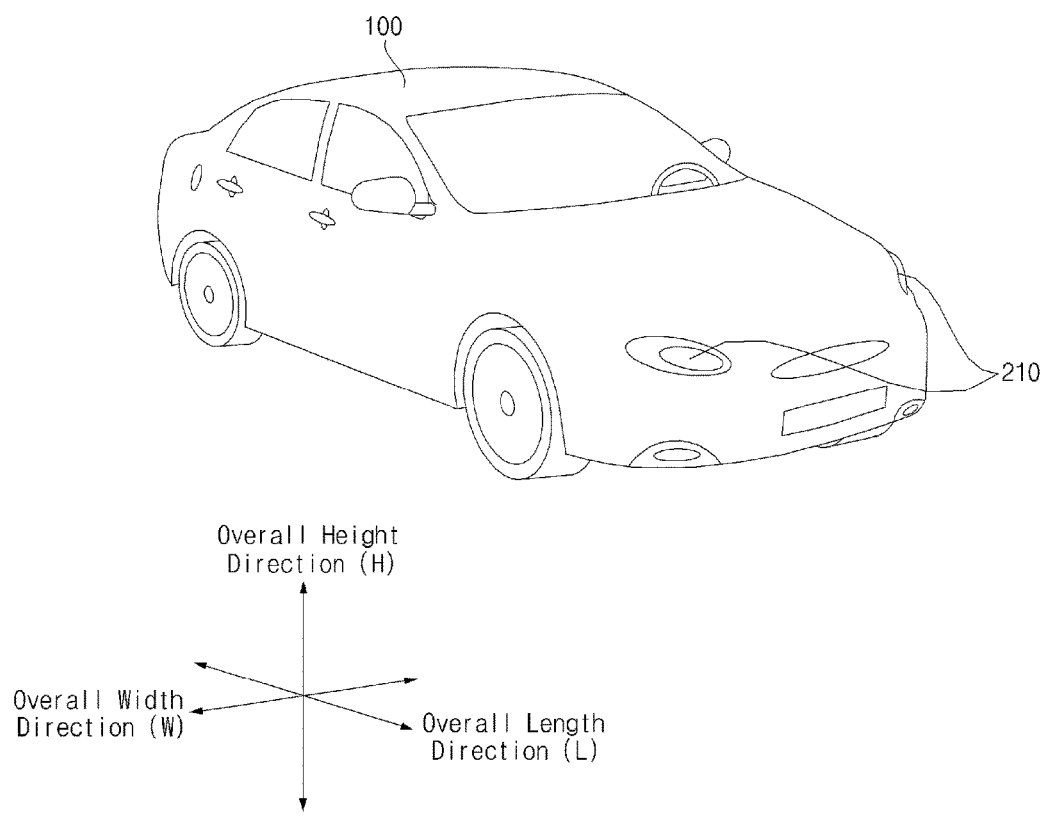
FIG. 1 is a diagram illustrating an example of the exterior of a vehicle according to some implementations.

The present disclosure relates to an input voltage stabilization circuit for a rear combination lamp in a vehicle. Also disclosed are a rear combination lamp that includes the input voltage stabilization circuit, and a vehicle that includes the rear combination lamp or the input voltage stabilization circuit of the rear combination lamp.

Light sources such as LEDs and LDs tend to have large light output intensities, and thus may be suitable for implementation in head lamps that illuminate a front of the vehicle to facilitate visibility for a driver.

However, light sources with large light intensities, such as LEDs and LDs, may not be suitable for rear combination lamps that are designed to provide various signals to other vehicles. In such scenarios, the large light intensities may be a distraction to drivers of those other vehicles.

In some implementations, a lamp may implement an Organic Light Emitting Diode (OLED) as a light source for the rear combination lamp of a vehicle. In some implementations, an OLED may be more suitable for a rear combination lamp of a vehicle and may output light that has lower intensities and that is more diffuse.

However, an OLED may require a different voltage value depending on an ambient temperature. In general, to drive an OLED, a relatively high voltage may be required at a low ambient temperature, and a relatively low voltage may be required at a high ambient temperature.

As such, if a lamp implements a plurality of OLEDs as a light source, then each OLED in the plurality of OLEDs may require a different voltage to be driven. In such scenarios, operating the overall lamp may require supplying sufficient electrical energy to satisfy the highest of voltages required among the individual OLEDs in the plurality of OLEDs.

Implementations disclosed herein provide an input voltage stabilization circuit may be configured to supply electrical energy based on the highest of voltages required for a plurality of individual OLEDs.

Such implementations may improve stability of power supplied to a rear combination lamp despite variable ambient temperatures. For example, if a vehicle is operated in severe cold or severe hot conditions, and if a rear combination lamp is configured with OLEDs, then implementations disclosed herein may mitigate the impact of variable ambient temperatures on the rear combination lamp. According to such implementations, the input voltage stabilization circuit may improve stable supply of power to each OLED in a rear combination lamp.

The term 'vehicle' used in the present disclosure may cover a car and a motorbike in concept. The following description is given with the appreciation that a vehicle is a car, by way of example.

In the present disclosure, a vehicle may be powered by any suitable power source. For example, a vehicle may be any of an internal combustion vehicle equipped with an engine as a power source, a hybrid vehicle equipped with an engine and an electrical motor as power sources, an electric vehicle equipped with an electrical motor as a power source, and the like.

In the following description, the left of a vehicle refers to the left-hand side in a traveling direction of the vehicle, and the right of the vehicle refers to the right-hand side in the traveling direction of the vehicle.

Figure 2:
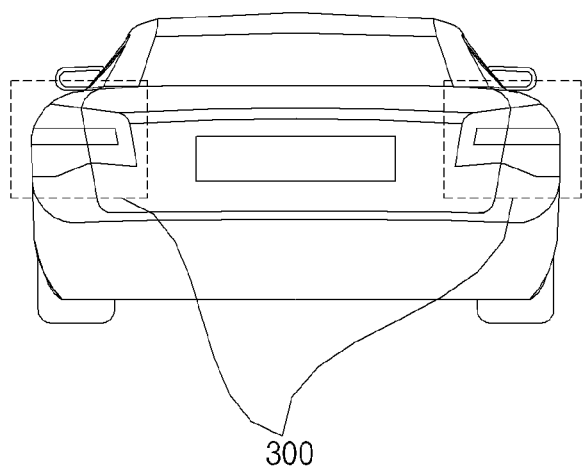
FIG. 2 is a diagram illustrating an example of rear combination lamps in a vehicle according to some implementations.

FIG. 1 illustrates the exterior of a vehicle according to some implementations, and FIG. 2 illustrates rear combination lamps in a vehicle according to some implementations.

Referring to FIGS. 1 and 2, a vehicle 100 may include wheels rotated by a power source, and a steering input device for controlling a heading of the vehicle 100.

According to an implementation, the vehicle 100 may be an autonomous vehicle. The autonomous vehicle may switch to an autonomous mode or a manual mode according to a user input. If the autonomous vehicle 100 switches to the manual mode, the autonomous vehicle 100 may receive a steering input through the steering input device.

The vehicle 100 may include vehicle lamps 200. The vehicle lamps 200 may include a head lamp 210, a brake lamp, a tail lamp, a turn signal lamp, a backup lamp, a fog lamp, a room lamp, and so on.

The vehicle lamps 200 may include the head lamp 210 and a rear combination lamp 300.

The rear combination lamp 300 may include an Organic Light Emitting Diode (OLED). The rear combination lamp 300 may include a plurality of OLEDs.

The rear combination lamp 300 may be installed on a rear side of the vehicle 100. The rear combination lamp 300 may function as a brake lamp, a tail lamp, a turn signal lamp, a backup lamp, and a fog lamp.

All or a part of the plurality of OLEDs may function as at least one of a brake lamp, a tail lamp, a turn signal lamp, a backup lamp, and a fog lamp.

In some implementations, the rear combination lamp 300 may include at least one processor, for example, implemented as a Micro Controller Unit (MCU) 500. The MCU 500 may control an operation of each of the plurality of OLEDs.

The MCU 500 may control individual illumination, sequential illumination, an illumination pattern, an illumination color, or a light intensity during illumination, for each of the plurality of OLEDs.

The MCU 500 may realize at least one of a brake lamp, a tail lamp, a turn signal lamp, a backup lamp, and a fog lamp by controlling the plurality of OLEDs.

An overall length refers to a length from the front side to the rear side of the vehicle 100, an overall width refers to a width of the vehicle 100, and an overall height refers to a length from the bottom of a wheel to the roof of the vehicle 100. In the following description, an overall length direction L may refer to a direction based on which the overall length of the vehicle 700 is measured, an overall width direction W may refer to a direction based on which the overall width of the vehicle 700 is measured, and an overall height direction H may refer to a direction based on which the overall height of the vehicle 700 is measured.

Figure 3:
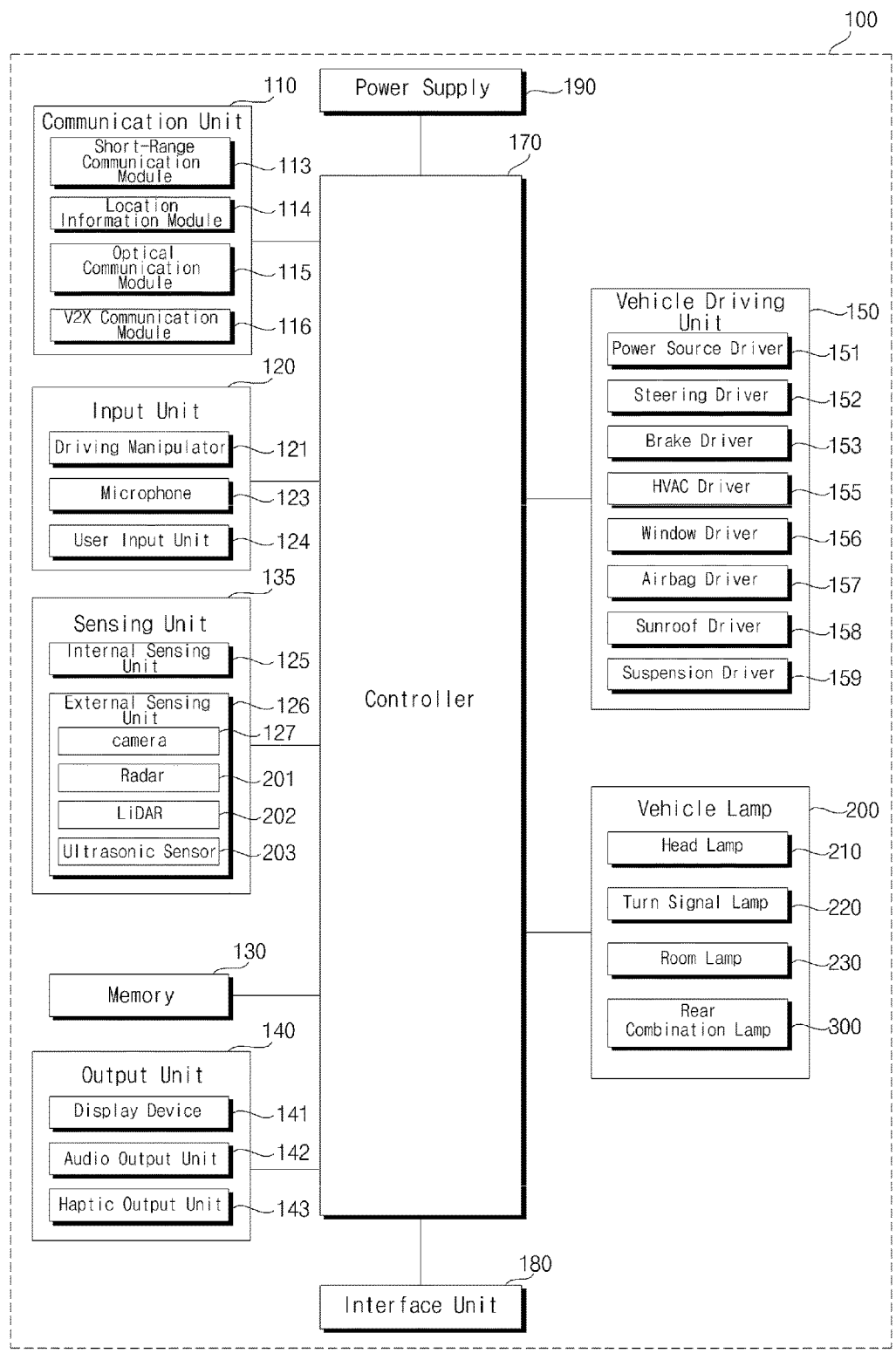
FIG. 3 is a block diagram illustrating an example of a vehicle according to some implementations.

FIG. 3 is a block diagram of a vehicle according to some implementations.

Referring to FIG. 3, the vehicle 100 may include a communication unit 110, an input unit 120, a memory 130, a sensing unit 135, an output unit 140, a vehicle driving unit 150, a controller 170, an interface unit 180, a power supply 190, and the vehicle lamps 200.

The communication unit 110 may include a short-range communication module 113, a location information module 114, an optical communication module 115, and a Vehicle to X (V2X) communication module 116.

The communication unit 110 may include one or more Radio Frequency (RF) circuits or devices to conduct communication with another device.

The short-range communication module 113 is used for short-range communication. The short-range communication module 113 may support short-range communication using at least one of Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, and Wireless Universal Serial Bus (Wireless USB).

The short-range communication module 113 may conduct short-range communication between the vehicle 100 and at least one external device by establishing a short-range wireless communication network. For example, the short-range communication module 113 may exchange data wirelessly with a mobile terminal. The short-range communication module 113 may receive weather information and traffic information (for example, Transport Protocol Expert Group (TPEG) information) from the mobile terminal. For example, if a user is aboard the vehicle 100, a mobile terminal of the user and the vehicle 100 may be paired with each other automatically or upon execution of an application by the user.

The location information module 114 is a module configured to determine a location of the vehicle 100. A major example of the location information module 114 is a Global Positioning System (GPS) module. For example, the location of the vehicle 100 may be determined using signals received from GPS satellites at the GPS module.

According to an implementation, the location information module 114 may be included in the sensing unit 135, not in the communication unit 110.

The optical communication module 115 may include an optical transmitter and an optical receiver.

The optical receiver may receive information by converting an optical signal to an electrical signal. The optical receiver may include a Photo Diode (PD) for receiving light. The PD may convert light to an electrical signal. For example, the optical receiver may receive information about a preceding vehicle by light emitted from a light source of the preceding vehicle.

The optical transmitter may include at least one light emitting device for converting an electrical signal to an optical signal. The light emitting device is preferably a Light Emitting Diode (LED). The optical transmitter converts an electrical signal to an optical signal and outputs the optical signal to the outside. For example, the optical transmitter may emit an optical signal to the outside by flickering a light emitting device corresponding to a predetermined frequency. According to an implementation, the optical transmitter may include a plurality of light emitting device arrays. According to an implementation, the optical transmitter may be integrated with a lamp provided in the vehicle 100. For example, the optical transmitter may be at least one of a head lamp, a tail lamp, a brake lamp, a turn signal lamp, and a position lamp. For example, the optical communication module 115 may exchange data with another vehicle by optical communication.

The V2X communication module 116 is a module used for wireless communication with a server or another vehicle. The V2X module 116 may include an RF circuit or device capable of implementing a Vehicle to Vehicle (V2V) communication protocol or a Vehicle to Infrastructure (V2I) protocol. The vehicle 100 may communicate wirelessly with an external server or another vehicle through the V2X communication module 116.

The input unit 120 may include a driving manipulator 121, a microphone 123, and a user input unit 124.

The driving manipulator 121 receives a user input for driving the vehicle 100. The driving manipulator 121 may include a steering input device, a shift input device, an acceleration input device, and a brake input device.

The steering input device receives a heading input for the vehicle 100 from the user. The steering input device is preferably configured as a wheel for enabling a steering input by rotation. According to an implementation, the steering input device may be configured as a touch screen, a touchpad, or a button.

The shift input device receives a parking (P) input, a drive (D) input, a neutral (N) input, and a reverse (R) input for the vehicle 100 from the user. The shift input device is preferably formed into a lever. According to an implementation, the shift input device may be configured as a touch screen, a touchpad, or a button.

The acceleration input device receives an acceleration input for the vehicle 100 from the user. The brake input device receives a deceleration input for the vehicle 100 from the user. The acceleration input device and the brake input device are preferably formed into pedals. According to an implementation, the acceleration input device or the brake input device may be configured as a touch screen, a touchpad, or a button.

The microphone 123 may process an external sound signal to electrical data. The processed data may be used in various manners according to a function being executed in the vehicle 100. The microphone 123 may convert a voice command of a user to electrical data. The converted electrical data may be provided to the controller 170.

According to an implementation, a camera 127 or the microphone 123 may be included in the sensing unit 135, instead of the input unit 120.

The user input unit 124 is configured to receive information from the user. Upon input of information through the user input unit 124, the controller 170 may control an operation of the vehicle 100 in correspondence with the input information. The user input unit 124 may include a touch input unit or a mechanical input unit. According to an implementation, the user input unit 124 may be disposed in an area of a steering wheel. In this case, the driver may manipulate the user input unit 124 with his or her finger, while grabbing the steering wheel.

The sensing unit 135 may sense a state and ambient situation of the vehicle 100. The sensing unit 135 may include an internal sensing unit 125 and an external sensing unit 126.

The internal sensing unit 125 senses a state of the vehicle 100. The internal sensing unit 125 may include a posture sensor (e.g., a yaw sensor, a roll sensor, and a pitch sensor), a collision sensor, a wheel sensor, a speed sensor, an inclination sensor, a weight sensor, a heading sensor, a yaw sensor, a gyro sensor, a position module, a vehicle forwarding/backwarding sensor, a battery sensor, a fuel sensor, a tire sensor, a hand rotation-based steering sensor, a vehicle internal temperature sensor, a vehicle internal humidity sensor, an ultrasonic sensor, an infrared sensor, an illumination sensor, an accelerator pedal position sensor, a brake pedal position sensor, and the like.

The internal sensing unit 125 may acquire sensing signals for vehicle posture information, vehicle collision information, vehicle heading information, vehicle location information (GPS information), vehicle angle information, vehicle speed information, vehicle acceleration information, vehicle inclination information, vehicle forwarding/backwarding information, battery information, fuel information, tire information, vehicle lamp information, vehicle internal temperature information, vehicle internal humidity information, a steering wheel rotation angle, a vehicle external illumination, a pressure applied to an accelerator pedal, a pressure applied to a brake pedal, and the like.

In some implementations, the internal sensing unit 125 may further include an accelerator pedal sensor, a pressure sensor, an engine speed sensor, an Air Flow Sensor (AFS), an Air Temperature Sensor (ATS), a Water Temperature Sensor (WTS), a Throttle Position Sensor (TPS), a Top Dead Center (TDC) sensor, a Crank Angle Sensor (CAS), and the like.

The external sensing unit 126 may sense an ambient situation of the vehicle. The external sensing unit 126 may sense an object outside of the vehicle 100. The object may be any of a lane, another vehicle, a pedestrian, light, a traffic signal, a road, a structure, a speed bump, topography, an animal, and the like.

A lane may be a traveling lane or a lane next to the traveling lane. The lane may conceptually include left and right lines that define the lane.

Another vehicle may be a vehicle traveling in the neighborhood of the vehicle 100. Another vehicle may be a vehicle located within a predetermined distance from the vehicle 100. Another vehicle may precede or follow the vehicle 100. Another vehicle may travel in a lane next to a traveling lane. Another vehicle may be a vehicle traveling in a direction crossing the traveling direction of the vehicle 100.

A pedestrian may be a person located on a sidewalk or on a road, or on any suitable environment around the vehicle.

The light may be generated in any suitable manner in the environment of the vehicle. For example, the light may be light generated from a lamp in another vehicle. The light may be emitted from a street lamp. The light may be sunlight.

A traffic signal may include a traffic light, a traffic sign, and a symbol or text drawn or written on the surface of a road.

A road may include a road surface, a curved portion on which the vehicle travels, an incline such as an uphill or a downhill portion, and the like.

A structure may be an object fixed on the ground in the vicinity of a road. For example, the structure may be any of a street lamp, a roadside tree, a building, a telephone pole, a traffic light, and the like.

The topography may include a mountain, a hill, and the like.

Objects may be classified as mobile objects or fixed objects. For example, the mobile objects may include another vehicle and a pedestrian. For example, the fixed objects may include a traffic light, a road, and a structure.

The external sensing unit 126 may include a camera 127, a radar 201, a Light Detection And Ranging (LiDAR) 202, and an ultrasonic sensor 203.

The camera 127 may be referred to as a vehicle camera device. The camera 127 may include a mono camera and/or a stereo camera.

The camera 127 may be installed at an appropriate position on the exterior of the vehicle 100 in order to acquire a vehicle outside image.

For example, the camera 127 may be disposed in the vicinity of a front windshield of the vehicle. In some implementations, the camera 127 may be disposed around a front bumper or a radiator grill of the vehicle.

For example, the camera 127 may be disposed near to a rear glass inside the vehicle 100 in order to acquire an image of a view behind the vehicle 100. In some implementations, the camera 127 may be disposed around a rear bumper, a trunk, or a tail gate of the vehicle.

For example, the camera 127 may be disposed near to a side window inside the vehicle 100 in order to acquire an image of a view from a side of the vehicle 100. In some implementations, the camera 127 may be disposed around a side mirror, a fender, or a door of the vehicle.

The radar 201 may include an electronic wave transmitter, an electronic wave receiver, and a processor. The radar 201 may operate in a pulse radar scheme or a continuous wave radar scheme. Specifically, if the radar 201 operates in the continuous wave radar scheme, the radar 201 may be implemented in Frequency Modulated Continuous Wave (FMCW) or Frequency Shift Keying (FSK) according to waveforms.

The radar 201 may detect an object based on transmitted electronic waves, and determine a distance and relative speed to the detected object.

The radar 201 may be disposed at an appropriate position on the exterior of the vehicle 100 in order to sense an object ahead of, behind, or on the side of the vehicle 100.

The LiDAR 202 may include a laser transmitter, a laser receiver, and a processor. The LiDAR 202 may be implemented in Time Of Flight (TOF) or phase shifting.

If the LiDAR 202 is a TOF type, it emits a laser pulse signal and receives a pulse signal reflected from an object. The LiDAR 202 may measure a distance to the object based on a time taken from emission of the laser pulse signal to reception of the reflected pulse signal. Also, the LiDAR 202 may measure a relative speed to the object based on a variation of the distance over time.

The LiDAR 202 may detect an object based on a transmitted laser beam and determine a distance and relative speed to the detected object.

The LiDAR 202 may be disposed at an appropriate position on the exterior of the vehicle 100 in order to sense an object ahead of, behind, or on the side of the vehicle 100.

The ultrasonic sensor 203 may include an ultrasonic wave transmitter, an ultrasonic wave receiver, and a processor. The ultrasonic sensor 203 may detect an object based on transmitted ultrasonic waves and determine a distance and relative speed to the detected object.

The ultrasonic sensor 203 may provide acquired object information to at least one processor, for example, the controller 170, an advanced driver assistance device, or a vehicle illumination device. The object information may include information about the distance to the object.

The ultrasonic sensor 203 may be disposed at an appropriate position on the exterior of the vehicle 100 in order to sense an object ahead of, behind, or on the side of the vehicle 100.

The memory 130 is electrically connected to the controller 170. The memory 130 may store basic data for a unit, control data for controlling an operation of the unit, and input and output data. The memory 130 may be any of various storage devices in hardware, such as Read Only Memory (ROM), Random Access Memory (RAM), Erasable and Programmable ROM (EPROM), flash drive, hard drive, etc. The memory 130 may store various data for overall operations of the vehicle 100, such as programs for processing or controlling in the controller 170.

The output unit 140 is configured to output information processed by the controller 170. The output unit 140 may include a display device 141, an audio output unit 142, and a haptic output unit 143.

The display device 141 may display various graphic objects. For example, the display device 141 may display vehicle-related information. The vehicle-related information may include vehicle control information for direct control of the vehicle or vehicle driver assistance information for guiding driving of the driver. Also, the vehicle-related information may include vehicle state information indicating a current state of the vehicle or vehicle traveling information related to traveling of the vehicle.

The display device 141 may include at least one of a Liquid Crystal Display (LCD), a Thin Film Transistor-Liquid Crystal Display (TFT LCD), an Organic Light Emitting Diode (OLED), a flexible display, a Three-Dimensional (3D) display, and an e-ink display.

The display device 141 may include a touch screen by forming a mutual layer structure with a touch sensor or being integrated with the touch sensor. The touch screen may serve as an output interface between the vehicle 100 and a user as well as the user input unit 124 that provides an input interface between the vehicle 100 and the user. In this case, the display device 141 may include a touch sensor for sensing a touch on the display device 141 in order to receive a control command in a touch manner. Thus, when the display device 141 is touched, the touch sensor may sense the touch, and thus the controller 170 may generate a control command corresponding to the touch. Content input by a touch may be a character, a number, or an indication or selectable menu item in various modes.

The display device 141 may include a cluster so that the driver may check vehicle state information or vehicle traveling information, while driving the vehicle 100. The cluster may be positioned on a dashboard. In this case, the driver may view information displayed on the cluster, while gazing ahead of the vehicle 100.

According to an implementation, the display device 141 may be configured as a Head Up Display (HUD). If the display device 141 is configured as a HUD, information may be output on a transparent display provided on a front windshield of the vehicle. In some implementations, the display device 141 may include a projection module and thus output information by an image projected on the front windshield.

According to an implementation, the display device 141 may include a transparent display. In this case, the transparent display may be attached on the front windshield.

The transparent display may display a predetermined screen, with a predetermined transparency. To be transparent, the transparent display may include at least one of a transparent Thin Film Electroluminiscent (TFEL) display, a transparent LCD, a transmissive transparent display, and a transparent LED display. The transparency of the transparent display may be controlled.

According to an implementation, the display device 141 may function as a navigation device.

The audio output unit 142 converts an electrical signal received from the controller 170 to an audio signal. For this purpose, the audio output unit 142 may include a speaker. The audio output unit 142 may output a sound corresponding to an operation of the user input unit 124.

The haptic output unit 143 generates a haptic output. For example, the haptic output unit 143 may vibrate the steering wheel, a safety belt, or a seat so that the user may recognize an output.

The vehicle driving unit 150 may control an operation of various devices of the vehicle 100. The vehicle driving unit 150 may include at least one of a power source driver 151, a steering driver 152, a brake driver 153, a Heating, Ventilating, and Air Conditioning (HVAC) driver 155, a window driver 156, an airbag driver 157, a sunroof driver 158, and a suspension driver 159.

The power source driver 151 may perform electronic control on a power source in the vehicle 100.

For example, if a fossil fuel-based engine is a power source, the power source driver 151 may perform electronic control on the engine. Therefore, the power source driver 151 may control the output torque of the engine. If the power source driver 151 is an engine, the power source driver 151 may restrict the speed of the vehicle by limiting the engine output torque under the control of the controller 170.

In another example, if an electrical motor is a power source, the power source driver 151 may control the motor. Thus, the rotation speed and torque of the motor may be controlled.

The steering driver 152 may perform electronic control on a steering device in the vehicle 100. Thus, the steering driver 152 may change a traveling direction of the vehicle 100.

The brake driver 153 may perform electronic control on a brake device in the vehicle 100. For example, the brake driver 153 may decrease the speed of the vehicle 100 by controlling an operation of a brake disposed at a tire. In another example, the traveling direction of the vehicle 100 may be adjusted to the left or right by differentiating operations of brakes disposed respectively at left and right tires.

The HVAC driver 155 may perform electronic control on a HVAC unit in the vehicle 100. For example, if a vehicle internal temperature is high, the HVAC unit may be controlled to operate and supply cool air into the vehicle 100.

The window driver 156 may perform electronic control on a window device in the vehicle 100. For example, opening and closing of left and right side windows of the vehicle 100 may be controlled.

The airbag driver 157 may perform electronic control on an airbag device in the vehicle 100. For example, the airbag driver 157 may control inflation of an airbag in an emergency situation.

The sunroof driver 158 may perform electronic control on a sunroof device in the vehicle 100. For example, the sunroof driver 158 may control opening or closing of a sunroof.

The suspension driver 159 may perform electronic control on a suspension device in the vehicle 100. For example, if the surface of a road is rugged, the suspension driver may control the suspension device to reduce jerk of the vehicle 100.

The vehicle driving unit 150 may further include a chassis driver. The chassis driver may conceptually include the steering driver 152, the brake driver 153, and the suspension driver 159.

The controller 170 may provide overall control to each unit inside the vehicle 100. The controller 170 may be referred to as an Electronic Control Unit (ECU).

The controller 170 may be implemented in hardware using at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a processor, a controller, a micro-controller, a microprocessor, and an electrical unit for executing other functions.

The interface unit 180 may serve as paths to various types of external devices connected to the vehicle 100. For example, the interface unit 180 may include a port connectable to a mobile terminal. The interface unit 180 may be connected to the mobile terminal through the port. In this case, the interface unit 180 may exchange data with the mobile terminal.

The interface unit 180 may serve as a path of supplying electrical energy to a connected mobile terminal. If the mobile terminal is electrically connected to the interface 180, the interface unit 180 may supply electrical energy received from the power supply 190 to the mobile terminal under the control of the controller 170.

The power supply 190 may supply power needed for operating each component under the control of the controller 170. Particularly, the power supply 190 may receive power from a battery within the vehicle 100.

The vehicle lamp 200 may include the head lamp 210, a turn signal lamp 220, a room lamp 230, and the rear combination lamp 300.

The head lamp 210 may be installed on the front of the vehicle 100 and emit light to the outside to ensure visibility for the driver at night.

The turn signal lamp 220 may be installed on the front, the rear, or a side of the vehicle 100 and emit light to signal turning or an emergency situation of the vehicle 100.

The room lamp 230 may be installed inside the vehicle 100 and emit light inside the vehicle 100.

The rear combination lamp 300 may be installed on the rear of the vehicle 100. The rear combination lamp 300 may include a plurality of OLEDs. The rear combination lamp 300 may function as at least one of a brake lamp, a tail lamp, a turn signal lamp, a backup lamp, and a fog lamp by controlling the plurality of individual OLEDs.

The rear combination lamp 300 may include an input voltage stabilization circuit 400.

The input voltage stabilization circuit 400 for a rear combination lamp may be referred to as an input voltage adjustment device for a rear combination lamp.

The input voltage stabilization circuit 400 for a rear combination lamp will be described in detail with reference to FIGS. 4 to 7.

Figure 4:
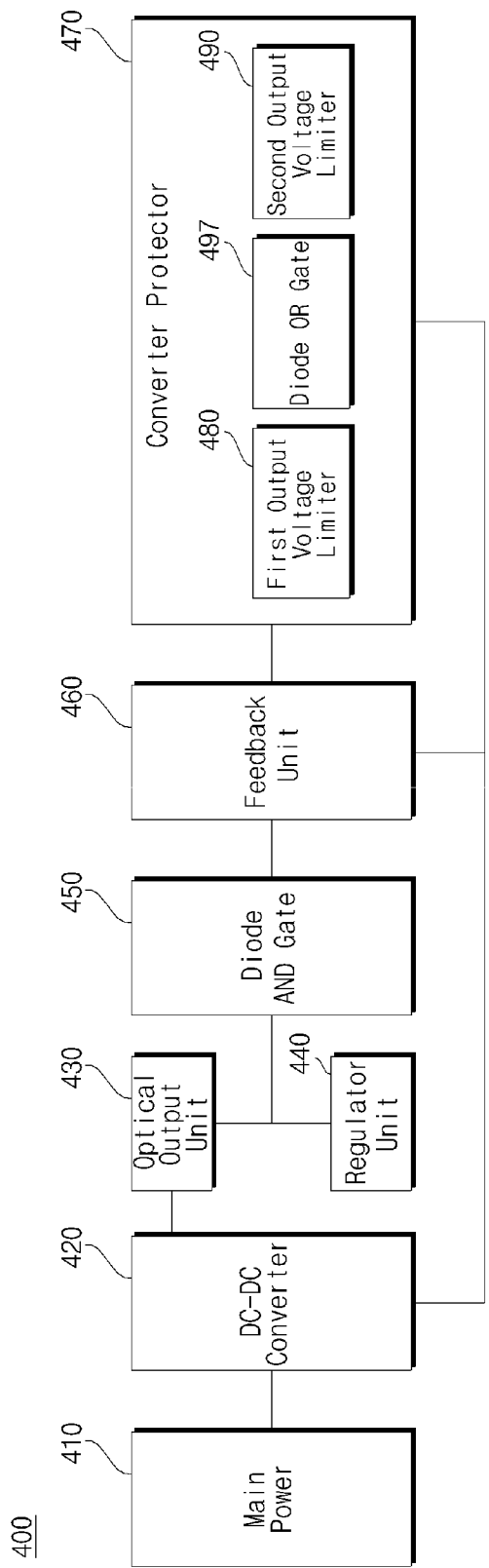
FIG. 4 is a block diagram illustrating an example of an input voltage stabilization circuit for a rear combination lamp according to some implementations.

FIG. 4 is a block diagram of an example of an input voltage stabilization circuit for a rear combination lamp according to some implementations.

Referring to FIG. 4, the input voltage stabilization circuit 400 for a rear combination lamp may include, among other components, a voltage converter, such as a Direct Current to Direct Current (DC-DC) converter 420, an optical output unit 430, a regulator unit 440, a diode AND gate 450, a feedback unit 460, and a converter protector 470.

The DC-DC converter 420 may be configured to raise or lower a voltage of main power 410. For example, the DC-DC converter 420 may implement at least one of a buck-boost converter, a cuk converter, a buck converter, or a boost converter, or any other suitable converter mechanism.

The DC-DC converter 420 may perform the voltage conversion and provide an output voltage that is suitable for driving a plurality of OLEDs.

The DC-DC converter 420 may adjust the output voltage based on a feedback received from the feedback unit 460. For example, the DC-DC converter 420 may adjust the output voltage so that the feedback received from feedback unit 460 is maintained to be a predetermined reference value.

In some implementations, the DC-DC converter 420 may adjust the output voltage based on a feedback received from the converter protector 470.

An individual OLED may require a different voltage according to an ambient temperature. For example, the OLED may require a voltage ranging from 5V to 20V according to an ambient temperature. In some scenarios, to drive an OLED, a relatively high voltage is required at a low temperature, and a relatively low voltage is required at a high temperature.

If a plurality of OLEDs are included in a lamp, then the lamp may be configured to operate based on sufficient electrical energy being supplied to satisfy the highest of voltages required for the individual OLEDs among the plurality of OLEDs.

According to an implementation of the present disclosure, the input voltage stabilization circuit 400 enables supply of electrical energy based on the highest of voltages required for the plurality of individual OLEDs.

If the vehicle 100 is operated outdoors, then the vehicle 100 may encounter severe cold and/or severe hot conditions. If a rear combination lamp is configured with OLEDs, the impact of an ambient temperature should be minimized. According to implementations disclosed herein, the input voltage stabilization circuit 400 enables a rear combination lamp with OLEDs to implement a stable supply of power to each OLED.

For example, the optical output unit 430 may include a plurality of OLEDs.

The rear combination lamp 300 may implement at least one of a brake lamp, a tail lamp, a turn signal lamp, a backup lamp, or a fog lamp, using a plurality of OLEDs.

The plurality of OLEDs may be divided into a plurality of groups, each including at least one OLED.

For example, a plurality of OLEDs in a first group may function as a brake lamp under the control of at least one processor, for example the MCU 500. A plurality of OLEDs in a second group may function as a tail lamp under the control of the MCU 500. A plurality of OLEDs in a third group may function as a turn signal lamp under the control of the MCU 500. A plurality of OLEDs in a fourth group may function as a backup lamp under the control of the MCU 500. A plurality of OLEDs in a fifth group may function as a fog lamp under the control of the MCU 500.

In general, the plurality of OLEDs may be configured as a different number of groups having different suitable operations for a vehicle.

According to an implementation, the plurality of OLEDs of a group may function as a plurality of lamps under the control of the MCU 500.

An OLED may require a different voltage according to an ambient temperature. The required voltage may be a voltage for driving the OLED. Specifically, the required voltage may be a voltage for emitting light from the OLED.

The regulator unit 440 may include a regulator. The regulator may be a linear regulator or a switching regulator. The regulator unit 440 may include a plurality of regulators mapped to the respective OLEDs. The plurality of regulators may be connected individually to the plurality of OLEDs. The regulators may stably drive the OLEDs by supplying a predetermined voltage to the OLEDs.

In some scenarios, if a voltage exceeding an upper limit is applied to a regulator, the regulator may be damaged. As such, a threshold for a feedback for operation of the DC-DC converter 420 may be set based on the upper voltage limit for preventing damage to a regulator.

The diode AND gate 450 may include a diode. The diode AND gate 450 may include a plurality of diodes. The diode AND gate 450 may include as many diodes as the number of OLEDs included in the optical output unit 430.

The diodes included in the diode AND gate 450 may be connected to connection nodes between the OLEDs and the regulators. That is, the OLEDs included in the optical output unit 430, the regulators included in the regulator unit 440, and the diodes included in the diode AND gate 450 may be connected to one another, thus forming nodes.

The plurality of diodes included in the diode AND gate 450 may be connected individually to the plurality of OLEDs included in the optical output unit 430 and the plurality of regulators included in the regulator unit 440.

The diode AND gate 450 may determine the highest of voltages applied to the plurality of OLEDs.

The diode AND gate 450 may determine the lowest of voltages applied to the connection nodes between the OLEDs and the regulators based on diode characteristics.

A voltage of a connection node is calculated by subtracting a voltage decrement incurred by an OLED from an output voltage of the DC-DC converter 420.

If a plurality of OLEDs are connected to a plurality of regulators, a plurality of connection nodes are formed. The lowest of voltages of the plurality of connection nodes may be the highest of voltages applied to the plurality of OLEDs.

The feedback unit 460 may provide information about the highest of voltages required for the plurality of OLEDs of the optical output unit 430 as a feedback to the DC-DC converter 420.

The feedback unit 460 may provide information about a voltage value determined by the diode AND gate 450 as a feedback to the DC-DC converter 420.

The feedback unit 460 may include a voltage division resistor unit and a capacitor unit.

The voltage division resistor unit may divide a voltage output from the diode AND gate 450 and output a divided voltage as a feedback. The voltage division resistor unit may include a plurality of resistors. The voltage division resistor unit may divide the voltage output from the diode AND gate 450 into a voltage acceptable for the DC-DC converter 420 via the plurality of resistors.

The capacitor unit may be connected in parallel to the voltage division resistor unit. The capacitor unit eliminates ripple or noise. For example, the capacitor unit may eliminate the ripple or noise of a feedback.

The converter protector 470 may be configured to protect the DC-DC converter 420, upon occurrence of failure in at least one of the plurality of OLEDs. For example, in some implementations, the converter protector 470 may include one or more output voltage limiters.

If a first OLED out of the plurality of OLEDs is out of order, it may be determined that a connection line of the first OLED is open. In this case, a voltage applied to the first OLED (i.e., a required voltage for the first OLED) becomes infinite. Also, the voltage of a node connecting the first OLED to a first regulator becomes 0V. In this case, the DC-DC converter 420 may continuously raise an output voltage to drive the first OLED, and as a result, may be failed.

Since the input voltage stabilization circuit 400 includes the converter protector 470, the input voltage stabilization circuit 400 may protect the DC-DC converter 470 even though at least one of the plurality of OLEDs is failed.

The converter protector 470 may include a first output voltage limiter 480, a second output voltage limiter 490, and a diode OR gate 497.

The first output voltage limiter 480 may provide information about a limit voltage value for limiting the output voltage of the DC-DC converter 420 as a feedback to the DC-DC converter 420.

The second output voltage limiter 490 may provide information about a limit voltage value based on temperatures sensed at a plurality of points of a circuit board as a feedback to the DC-DC converter 420.

The second output voltage limiter 490 may include a plurality of Negative Temperature Coefficient (NTC) thermistors, and a diode AND gate.

The plurality of NTC thermistors may be arranged at a plurality of points of the circuit board where the plurality of temperatures are to be sensed on the circuit board.

The diode AND gate may determine the highest of voltages applied to the individual NTC thermistors.

The diode OR gate 497 may select the higher between a voltage value output from the first output voltage limiter 480 and a voltage value output from the second output voltage limiter 490. The diode OR gate 497 may provide the selected voltage value as a feedback to the DC-DC converter 420.

In some implementations, the input voltage stabilization circuit 400 may further include a failure sensing unit.

The failure sensing unit may detect failure of at least one of the plurality of OLEDs.

The failure sensing unit will be described in greater detail with reference to FIG. 6.

In some implementations, the input voltage stabilization circuit 400 may further include at least one processor, for example the MCU 500.

The MCU 500 may control an optical output pattern of each of the OLEDs based on a Pulse Width Modulation (PWM) signal.

The MCU 500 may be implemented using at least one of an ASIC, a DSP, a DSPD, a PLD, an FPGA, a processor, a controller, a micro-controller, a microprocessor, or an electrical unit for executing other functions.

Control of the optical output pattern of each of the plurality of OLEDs by the MCU 500 will be described in greater detail with reference to FIGS. 8 to 13.

In some implementations, the input voltage stabilization circuit 400 may further include a main power sensing unit and an emergency power connection unit.

The main power sensing unit may be configured to sense an abnormal state of a main power supply line that supplies power, for example, from the vehicle battery.

The emergency power connection unit may supply a voltage for providing a PWM signal to the DC-DC converter.

The main power sensing unit and the emergency power connection unit will be described in greater detail with reference to FIG. 7.

Figure 5:
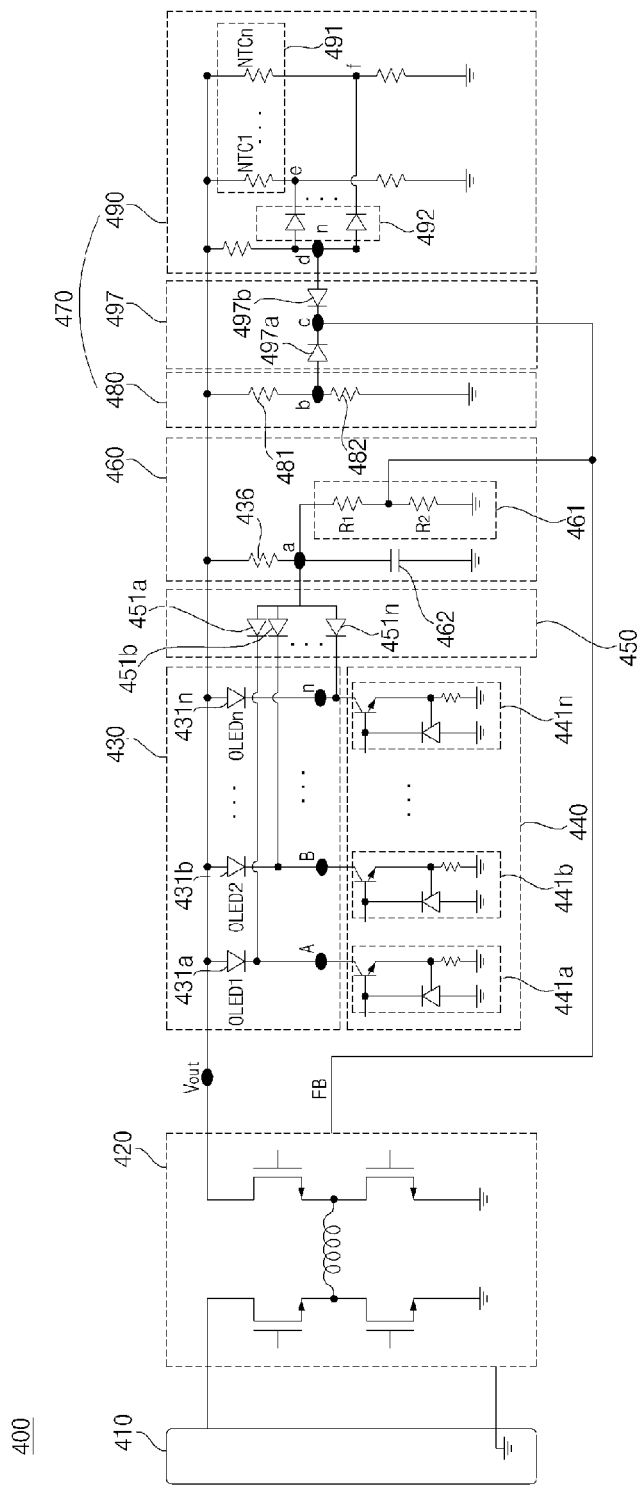
FIGS. 5, 6, and 7 are diagrams illustrating examples of input voltage stabilization circuits for a rear combination lamp according to some implementations.
Figure 6:
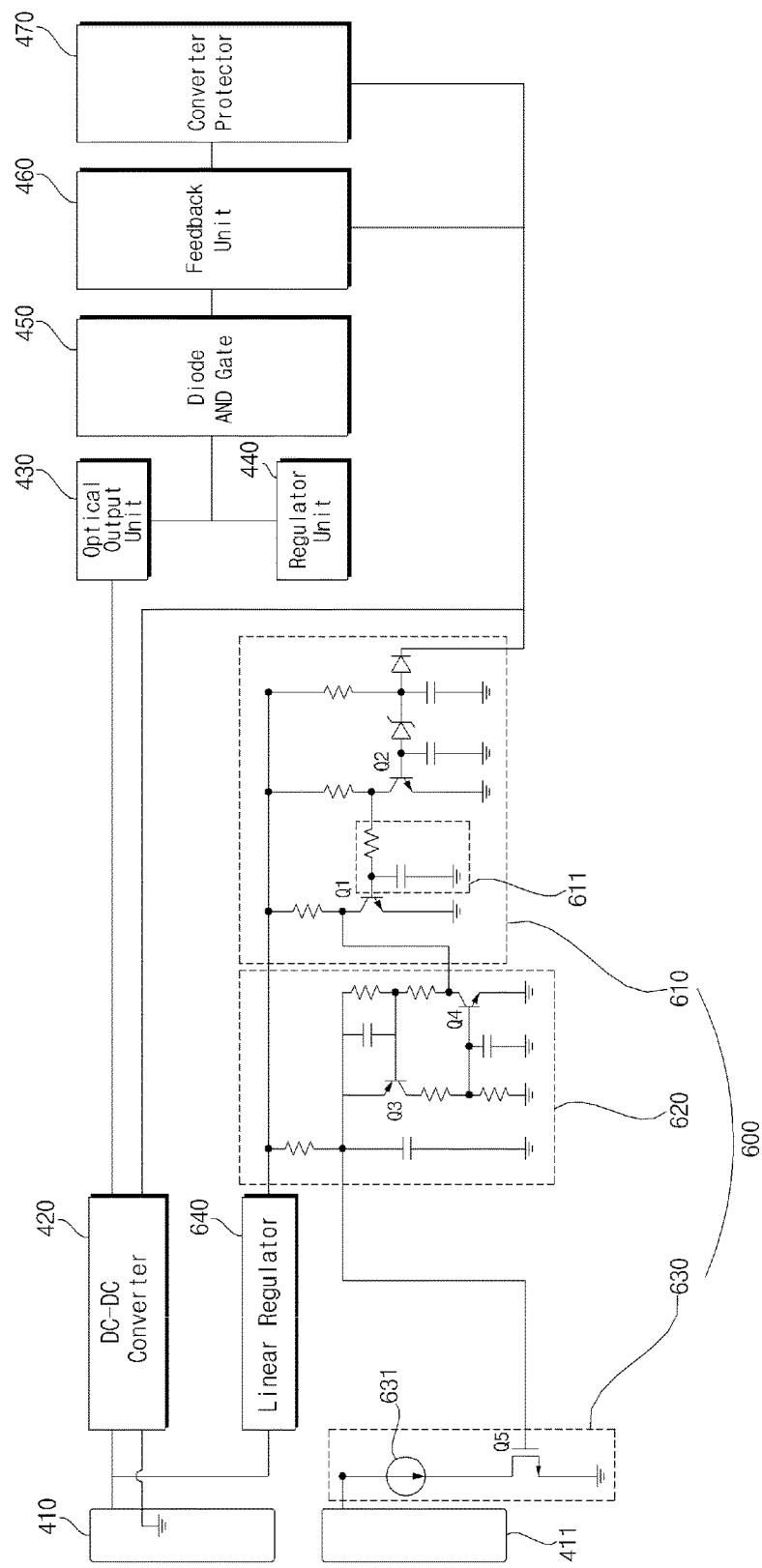
Figure 7:
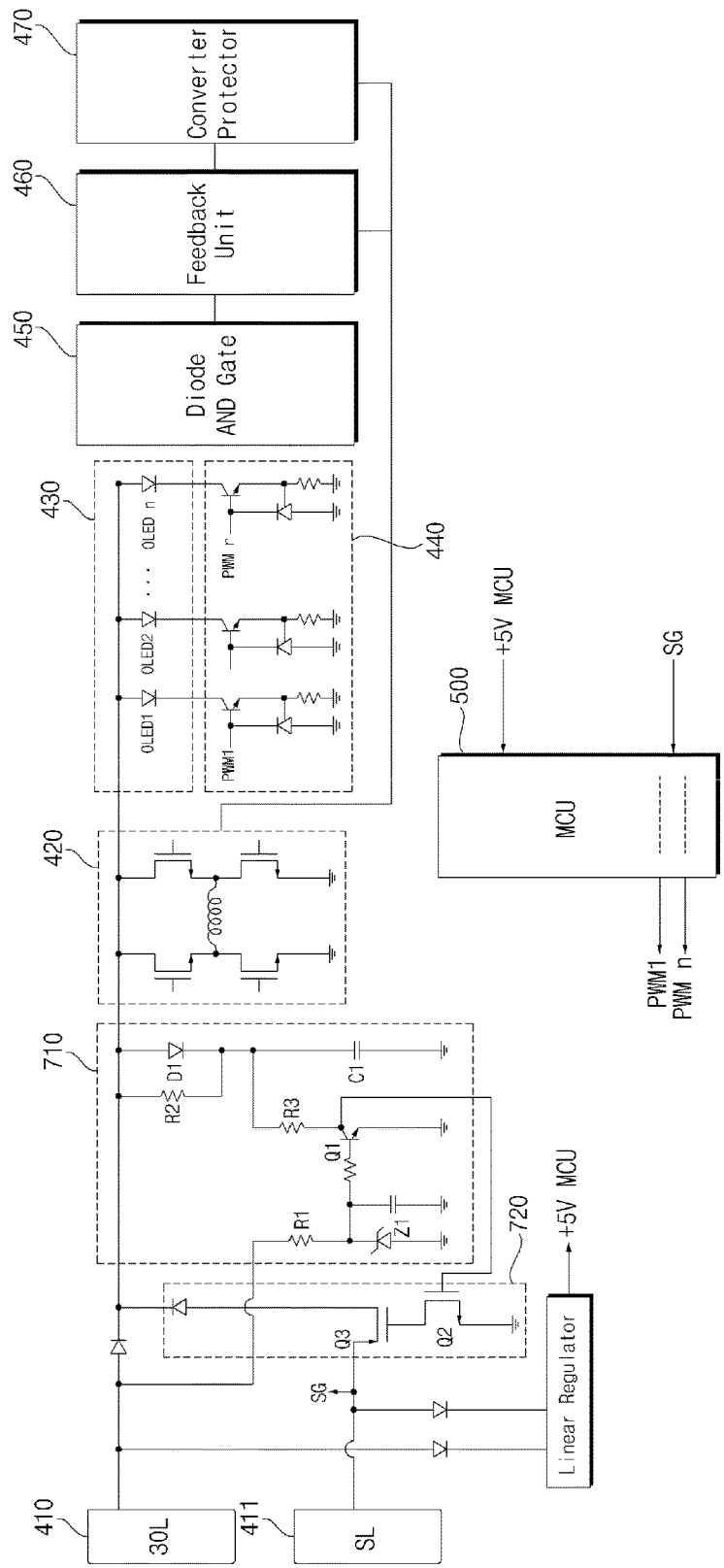

FIGS. 5, 6, and 7 are diagrams illustrating examples of input voltage stabilization circuits for a rear combination lamp according to implementations of the present disclosure.

Referring to FIG. 5, the DC-DC converter 420 may raise or lower the voltage of the main power 410 supplied by a vehicle battery.

The DC-DC converter 420 may adjust an output voltage $V_{out}$ based on a feedback FB received from the feedback unit 460. For example, the DC-DC converter 420 may adjust the output voltage so that the feedback received from the feedback unit 460 may be maintained to be a predetermined reference value.

The reference value for a feedback may be set based on a limit voltage value for preventing damage to regulators 441a, 441b, ..., 441n.

The DC-DC converter 420 may adjust the output voltage $V_{out}$ based on a feedback FB received from the converter protector 470.

The optical output unit 430 may include a plurality of OLEDs 431a, 431b, ..., 431n.

The plurality of OLEDs may require variable voltages according to ambient temperatures.

For example, first and second OLEDs 431a and 431b may require different voltages depending on positions of the first and second OLEDs 431a and 431b arranged on the circuit board, closeness to the outside of the vehicle, or existence of a nearby heat emission device. If the first OLED 431a requires a higher voltage than the second OLED 431b, the DC-DC converter 420 may have to provide the output voltage $V_{out}$ based on the required voltage of the first OLED 431a to thereby operate both the first and second OLEDs 431a and 431b.

The regulator unit 440 may include the plurality of regulators 441a, 441b, ..., 441n. The regulator unit 410 may include as many regulators 441a, 441b, ..., 441n as the number of the plurality of OLEDs 431a, 431b, ..., 431n.

The plurality of regulators 441a, 441b, ..., 441n are connected to the respective OLEDs 431a, 431b, ..., 431n and supply a predetermined voltage to each of the OLEDs 431a, 431b, ..., 431n. In this case, each of the OLEDs 431a, 431b, ..., 431n may be driven stably.

The plurality of regulators 441a, 441b, ..., 441n may be connected individually to the plurality of OLEDs 431a, 431b, ..., 431n.

As the plurality of regulators 441a, 441b, ..., 441n are connected to the plurality of OLEDs 431a, 431b, ..., 431n, a plurality of connection nodes A, B, ..., N may be formed.

For example, the first OLED 431a and the first regulator 441a may be connected, thereby forming a first connection node A. The second OLED 431b and the second regulator 441b may be connected, thereby forming a second connection node B. The $n^{th}$ OLED 431n and the $n^{th}$ regulator 441n may be connected, thereby forming an $n^{th}$ connection node N.

The diode AND gate 450 may include a plurality of diodes 451a, 451b, ..., 451n. The diode AND gate 450 may include as many diodes as the number of the OLEDs 431a, 431b, ..., 431n or the number of the regulators 441a, 441b, ..., 441n.

The plurality of diodes 451a, 451b, ..., 451n may be connected to the plurality of OLEDs 431a, 431b, ..., 431n and the plurality of the regulators 441a, 441b, ..., 441n.

For example, the first diode 451a may be connected to the first connection node A, the second diode 451b may be connected to the second connection node B, and in general the $n^{th}$ diode 451n may be connected to the $n^{th}$ connection node N.

Cathodes of the plurality of diodes 451a, 451b, ..., 451n may be arranged in the direction of the plurality of connection nodes A, B, ..., N, and anodes of the plurality of diodes 451a, 451b, ..., 451n may be arranged in the direction of the feedback unit 460.

The diode AND gate 450 may determine the highest of voltages applied to the plurality of OLEDs 431a, 431b, ..., 431n based on diode characteristics.

The diode AND gate 450 may determine the lowest of voltages applied to the plurality of connection nodes A, B, ..., N and output information about the determined voltage to the feedback unit 460.

A voltage calculated by subtracting a voltage decrement caused by each of the OLEDs 431a, 431b, ..., 431n from the output voltage $V_{out}$ of the DC-DC converter 420 is applied to a connection node corresponding to the OLED.

The lowest of voltages applied to the connection nodes is the highest of voltages applied to the OLEDs.

The feedback unit 460 may provide information about the highest of voltages required for the plurality of OLEDs 431a, 431b, ..., 431n as a feedback to the DC-DC converter 420.

The feedback unit 460 may provide information about the voltage value determined by the diode AND gate 450 as a feedback to the DC-DC converter 420.

The diode AND gate 450, the voltage division resistor unit 461, the capacitor unit 462, and a resistor unit 436 may be connected to one another, thereby forming a feedback node a.

The voltage determined by the diode AND gate 450 may be applied to the feedback node a.

The voltage division resistor unit 461 may divide the voltage applied to the feedback node a and output a divided voltage to the DC-DC converter 420.

The capacitor unit 462 may be connected to the voltage division resistor unit 461 in parallel. The capacitor unit 462 eliminates ripple or noise. For example, the capacitor unit 462 eliminates the ripple or noise of the voltage applied to the feedback node a.

Upon occurrence of failure in at least one of the OLEDs, the converter protector 470 may protect the DC-DC converter 420.

The converter protector 470 may include the first output voltage limiter 480, the second output voltage limiter 490, and the diode OR gate 497.

The first output voltage limiter 480 may provide information about a limit voltage value for limiting the output voltage of the DC-DC converter 420 as a feedback to the DC-DC converter 420.

The first output voltage limiter 480 may include a voltage division resistor unit. A first resistor 481 and a second resistor 482 of the voltage division resistor unit are connected to each other, forming a limit voltage node b. A voltage divided from the output voltage $V_{out}$ is applied to the limit voltage node b.

The voltage division resistor unit of the first output voltage limiter 480 may divide a limit voltage value into a voltage acceptable for the DC-DC converter.

The divided limit voltage value may be output to the diode OR gate 497.

The second output voltage limiter 490 may provide information about a limit voltage value based on temperatures sensed at a plurality of points of a circuit board as a feedback to the DC-DC converter 420.

The second output voltage limiter 490 may include a plurality of NTC thermistors 491, and a diode AND gate 492.

The plurality of NTC thermistors 491 may be arranged at a plurality of points of the circuit board where the plurality of temperatures is to be sensed on the circuit board. In some implementations, the plurality of NTC thermistors 491 may be arranged at points having low temperatures on the circuit board. For example, the plurality of NTC thermistors 491 may be arranged at points on the circuit board that are removed from a heat emission device, or may be arranged at points on the circuit board near an outside of the vehicle.

The diode AND gate 492 may determine the highest of voltages applied to the individual NTC thermistors 491.

The diode AND gate 492 may determine a point with a lowest temperature from among the points at which the NTC thermistors 491 are arranged.

The NTC thermistors 491 are characterized in that as temperature increases, resistance decreases. The resistance of the NTC thermistors 491 is highest at a point with a lowest temperature among the points at which the NTC thermistors 491 are arranged.

The diode AND gate 492 may determine the lowest of voltages calculated by subtracting voltages decrements caused by the NTC thermistors 491 from the output voltage $V_{out}$ and output the lowest voltage to the diode OR gate 497.

The diode OR gate 497 may determine the higher between a voltage value output from the first output voltage limiter 480 and a voltage value output from the second output voltage limiter 490. The diode OR gate 497 may provide the determined voltage value as a feedback to the DC-DC converter 420.

The diode OR gate 497 outputs a voltage from the second output voltage limiter 490 with priority over the first output voltage limiter 480, satisfying the condition that the output voltage $V_{out}$ is less than the limit voltage of the first output voltage limiter 480.

Compared to the input voltage stabilization circuit illustrated in FIG. 5, the input voltage stabilization circuit illustrated in FIG. 6 further includes a failure sensing unit.

The description of the input voltage stabilization circuit illustrated in FIG. 5 may also be applied to the input voltage stabilization circuit illustrated in FIG. 6. The following description will focus on the failure sensing unit with reference to FIG. 6.

Referring to FIG. 6, a failure sensing unit 600 may sense failure of at least one of the plurality of OLEDs.

In some implementations, the input voltage stabilization circuit 400 may further include a linear regulator 640. The linear regulator 640 may apply a constant voltage to the failure sensing unit 600.

The failure sensing unit 600 may include an open sensor 610, a latch circuit 620, and a constant current circuit 630.

The open sensor 610 may include a first transistor Q1, a second transistor Q2, and a delay circuit 611 interposed between the first transistor Q1 and the second transistor Q2.

The latch circuit 620 may include a third transistor Q3 and a fourth transistor Q4.

The constant current circuit 630 may include a constant current source 631 and a fifth transistor Q5.

If all of the OLEDs 431a, 431b, . . . , 431n operate normally, the second transistor Q2 is turned on, the first transistor Q1 is turned off, the fourth transistor Q4 is turned off, the third transistor Q3 is turned off, and the fifth transistor Q5 is turned on, sequentially. Thus, current flows by means of the constant current source 631.

A control signal provider 411 may sense the current flowing by means of the constant current source 631 and thus determine that all of the OLEDs 431a, 431b, . . . , 431n operate normally.

If one of the OLEDs 431a, 431b, . . . , 431n is failed, a voltage output as a feedback becomes 0V or almost 0V. In this case, the second transistor Q2 is turned off, the first transistor Q1 is turned on, the fourth transistor Q4 is turned on, the third transistor Q3 is turned on, and the fifth transistor Q5 is turned off, sequentially. As a result, current generated from the constant current source 631 does not flow.

The control signal provider 411 may fail to sense current flowing by means of the constant current source 631 and thus determine that failure has occurred to at least one of the plurality of OLEDs 431a, 431b, . . . , 431n. The control signal provider 411 may provide failure occurrence information to the controller 170 of the vehicle 100. The controller 170 of the vehicle 100 may output failure information about the rear combination lamp 300 through the output unit 140.

In some implementations, the delay circuit 611 may prevent the first transistor Q1 from operating not by a voltage value output from the feedback unit 460 but by a voltage value provided by the linear regulator 640.

Once the latch circuit 620 is operated by the first transistor Q1, the latch circuit 620 may keep the fifth transistor Q5 off until before reset.

The input voltage stabilization circuit illustrated in FIG. 7 further includes an MCU, a main power sensing unit, and an emergency power connection unit, compared to the input voltage stabilization circuit illustrated in FIG. 5 or FIG. 6.

The description of the input voltage stabilization circuit illustrated in FIG. 5 or FIG. 6 is applicable to the input voltage stabilization circuit illustrated in FIG. 7. The following description will be given of FIG. 7, focusing on the MCU, the main power sensing unit, and the emergency power connection unit.

Referring to FIG. 7, the MCU 500 may control the optical output pattern of each OLED based on a PWM signal.

While the MCU 500 is shown in FIG. 7 as not connected to other components for the convenience of illustration and convenience, the MCU 500 may be electrically connected to other components in some implementations. For example, the MCU 500 may be connected to the linear regulator 640 to thereby receive power, and to the optical output unit 430 and the regulator unit 440 to thereby control the plurality of OLEDs 431a, 431b, . . . , 431n.

The MCU 500 may receive the main power source 410 or power from the control signal provider 411.

The MCU 500 may receive a control signal SG from the control signal provider 411.

In some implementations, the input voltage stabilization circuit 400 may further include a main power sensing unit 710 and an emergency power connection unit 720.

The main power sensing unit 710 may sense an abnormal state of a main power supply line.

The main power sensing unit 710 may include a first resistor R1, a second resistor R2, a third resistor R3, a first diode D1, a first capacitor C1, and a first transistor Q1.

The emergency power connection unit 720 may supply a voltage for providing a PWM signal to the DC-DC converter.

The emergency power connection unit 720 may include a second transistor Q2 and a third transistor Q3.

The first diode D1 is connected serially to the first capacitor C1. The first diode D1 is connected to the main power 410.

If the line of the main power 410 is normal, current may flow through the first diode D1 and the first capacitor C1 may be charged with a voltage.

If the line of the main power 410 is normal, the first transistor Q1 is turned on, the second transistor Q2 is turned off, and the third transistor Q3 is turned off.

In some implementations, the second resistor R2 is connected in parallel to the first diode D1. The second resistor R2 is a discharge resistor. If an external high-voltage surge input is received over a long time, the second resistor R2 prevents the first capacitor C1 from exceeding a withstanding voltage of the first capacitor C1.

If the line of the main power 410 is abnormal, the first transistor Q is turned off. In this case, the voltage stored in the first capacitor C1 is applied to the second transistor Q2, thus turning on the second transistor Q2 and then the third transistor Q3. Then, the control signal provider 411 supplies a voltage for providing a PWM signal to the DC-DC converter 420.

The control signal provider 411 provides a control signal SG to the MCU 500. The control signal SG may be a PWM signal. As described above, if the line of the main power 410 is abnormal, the control signal provider 411 may be connected to the DC-DC converter 420 and thus a voltage for providing a PWM signal may be supplied to the DC-DC converter 420.

FIGS. 8 to 13 are diagrams illustrating examples of controlling a signal of a rear combination lamp according to an implementation of the present disclosure.

The MCU 500 may receive a PWM signal from the control signal provider 411. The MCU 500 may control the plurality of OLEDs according to the received PWM signal.

The PWM signal may be configured in various forms. The MCU 500 may control a plurality of OLEDs matching a predetermined PWM signal.

In some implementations, the rear combination lamp 300 may include a left rear combination lamp 300L and a right rear combination lamp 300R.

Although the rear combination lamp 300 is described as including six OLEDs in FIGS. 8 to 13, the number of OLEDs is not limited thereto, and may be any suitable number.

Figure 8:
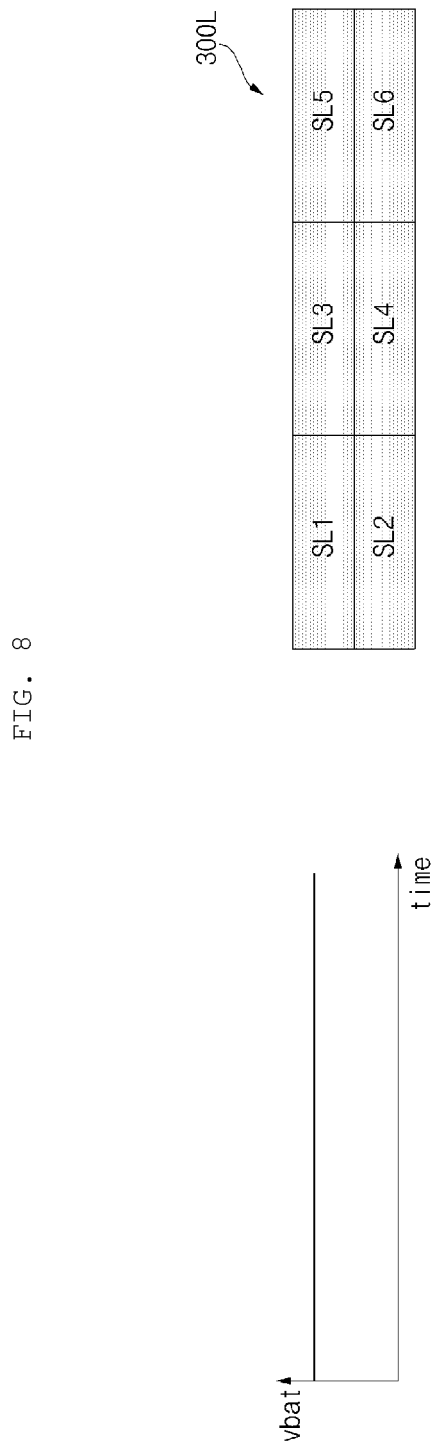
FIGS. 8 to 13 are diagrams illustrating examples of controlling a signal of a rear combination lamp according to some implementations.
Figure 13:
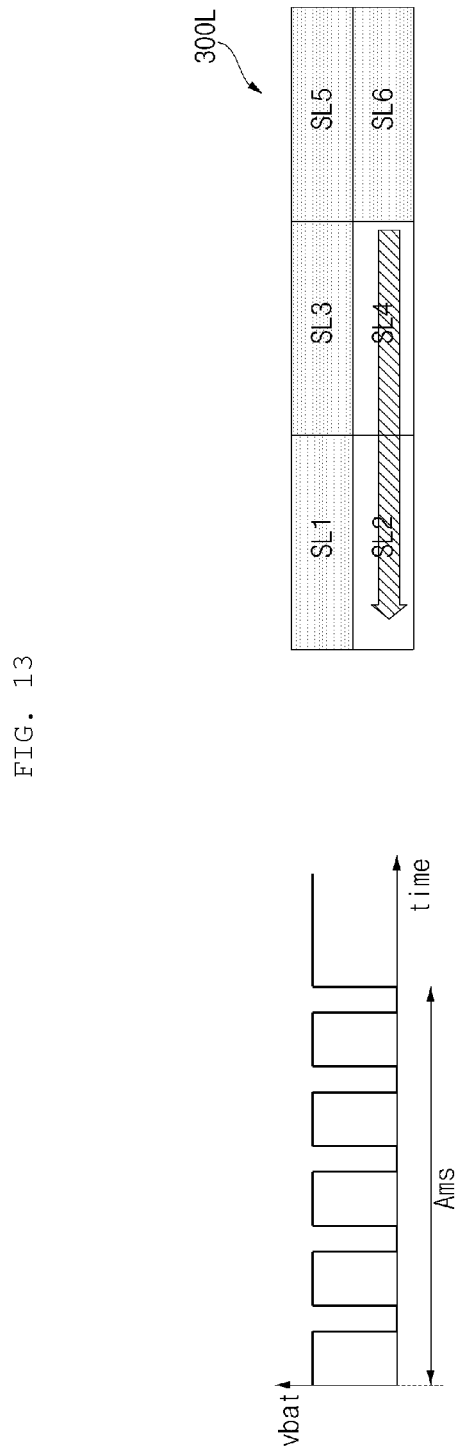

While only the left rear combination lamp 300L is described in FIGS. 8 and 13, by way of example, the right rear combination lamp 300R may be controlled in the same manner as the left rear combination lamp 300L.

Referring to FIG. 8, if a predetermined voltage is applied, the MCU 500 turns on all of the plurality of OLEDs SL1 to SL6.

Figure 9:
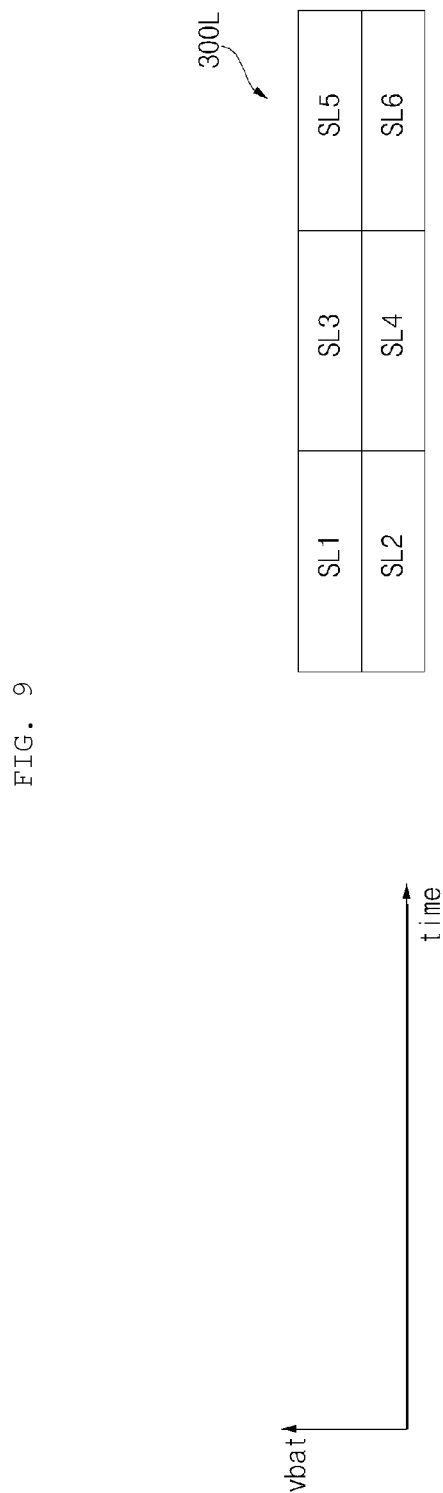

Referring to FIG. 9, if a voltage is not applied, the MCU 500 turns off all of the plurality of OLEDs SL1 to SL6.

Figure 10:
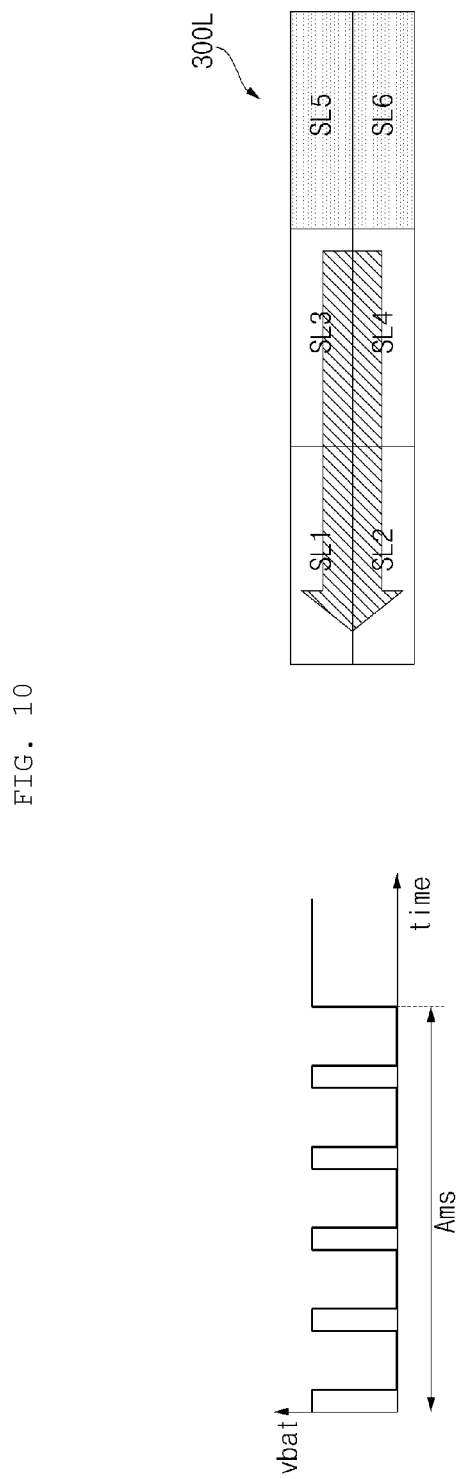

Referring to FIG. 10, if a pulse voltage with a duty rate of a % is applied, the MCU 500 turns on the fifth and sixth OLEDs SL5 and SL6. After a predetermined time elapses, the MCU 500 turns on the third and fourth OLEDs SL3 and SL4. Then after a predetermined time elapses, the MCU 500 turns on the first and second OLEDs SL1 and SL2.

Figure 11:
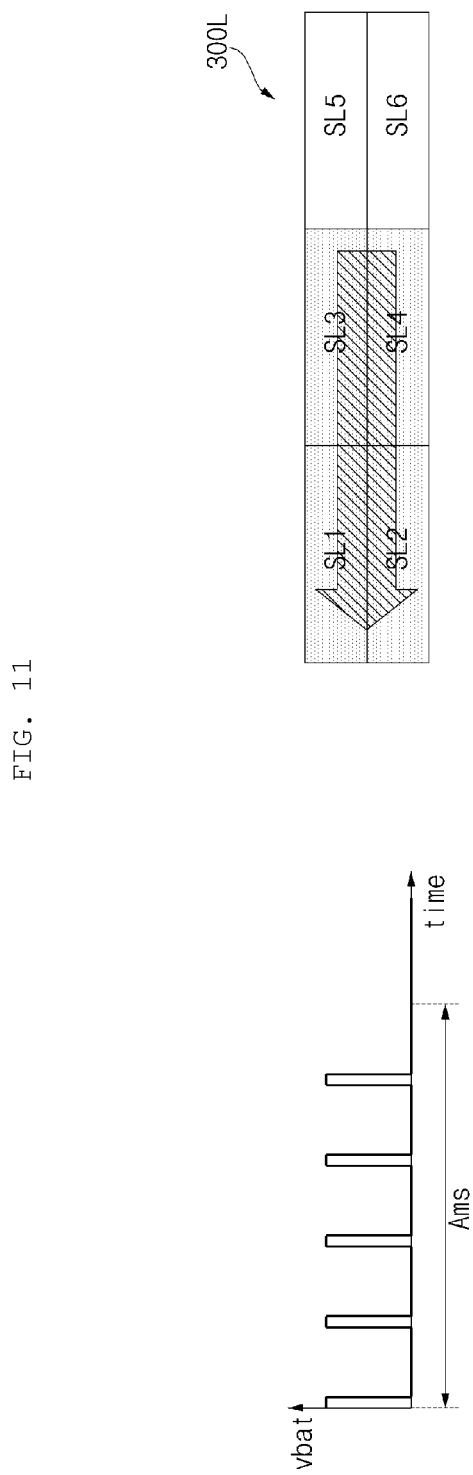

Referring to FIG. 11, if a pulse voltage with a duty rate of b % is applied, the MCU 500 turns off the fifth and sixth OLEDs SL5 and SL6. After a predetermined time elapses, the MCU 500 turns off the third and fourth OLEDs SL3 and SL4. Then after a predetermined time elapses, the MCU 500 turns off the first and second OLEDs SL1 and SL2.

Figure 12:
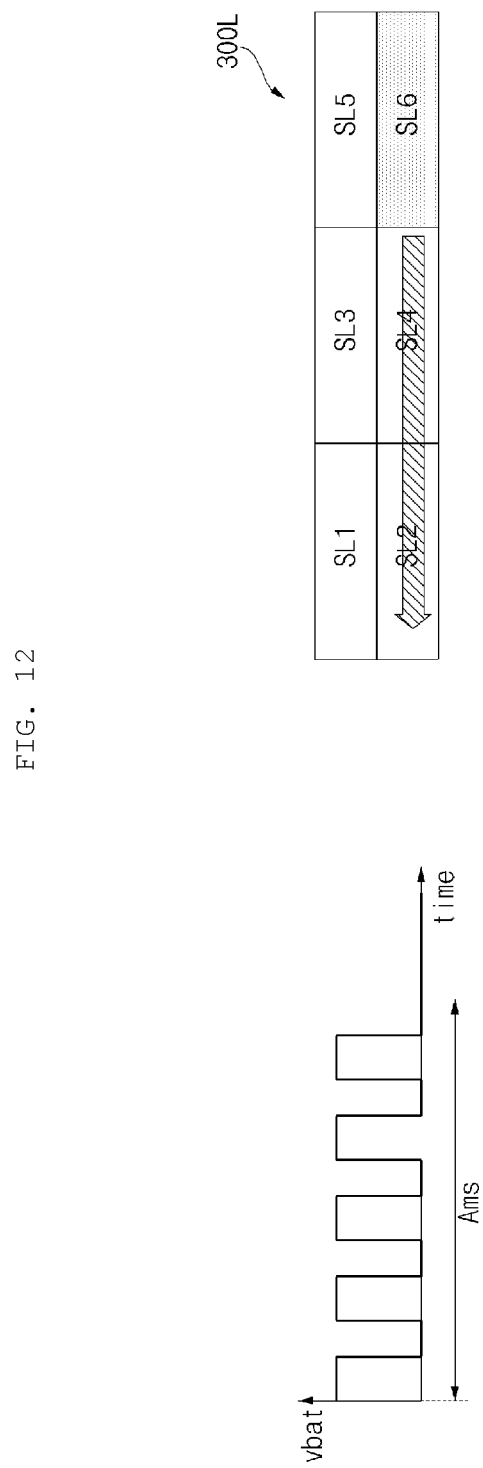

Referring to FIG. 12, if a pulse voltage with a duty rate of c % is applied, the MCU 500 turns on the sixth OLED SL6. Then, the MCU 500 turns on the fourth OLED SL4. Then, the MCU 500 turns on the second OLED SL2.

As described above, an operation of a turn signal lamp may be performed by sequentially turning on a plurality of OLEDs.

Referring to FIG. 13, if a pulse voltage with a duty rate of d % is applied, with the first, third, and fifth OLEDs SL1, SL3, and SL5 turned on, the MCU 500 turns on the sixth OLED SL6. Then, the MCU 500 turns on the fourth OLED SL4. Then, the MCU 500 turns on the second OLED SL2.

As described above, in a state where a tail lamp is turned off, an operation of a turn signal lamp may be performed by sequentially turning on a plurality of OLEDs.

As is apparent from the foregoing description, the implementations of the present disclosure have the following one or more effects.

First, a signal can be effectively transmitted using an OLED in a rear combination lamp, without dazzling a driver of another vehicle.

Secondly, various signals may be transmitted using a plurality of OLEDs.

Thirdly, OLEDs can be driven stably despite a change of an ambient temperature.

Fourthly, a circuit device can be minimized, a circuit board space can be secured, and load on an MCU can be minimized.

Implementations disclosed herein may be implemented as code that may be written on a computer-readable recording medium and thus read by a computer system. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), a Read Only Memory (ROM), a Random Access Memory (RAM), a Compact Disk ROM (CD-ROM), a magnetic tape, a floppy disc, an optical data storage, and a carrier wave (e.g., data transmission over the Internet). The computer may include a processor a controller. The above implementations are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:
1. An input voltage stabilization circuit for a rear combination lamp, comprising:
   an optical output unit comprising a plurality of Organic Light Emitting Diodes (OLEDs);
   a voltage converter configured to supply an output voltage for driving the plurality of OLEDs by converting a first voltage supplied by a vehicle battery to the output voltage, the output voltage being different from the first voltage;

a feedback unit configured to provide, as feedback to the voltage converter, information regarding a maximum voltage value for the plurality of OLEDs; and a converter protector configured to, upon occurrence of a failure in at least one of the plurality of OLEDs, protect the voltage converter, wherein the voltage converter is further configured to adjust the output voltage based on the information provided as feedback by the feedback unit regarding the maximum voltage value for the plurality of OLEDs, wherein the converter protector comprises a first output voltage unit configured to provide, as feedback to the voltage converter, information regarding a first limit voltage value based on a plurality of temperatures sensed at a plurality of points of a circuit board, and wherein the first output voltage unit further comprises a diode AND gate configured to determine a maximum voltage among a plurality of voltages applied to a plurality of Negative Temperature Coefficient (NTC) thermistors.

2. The input voltage stabilization circuit according to claim 1, further comprising a regulator unit comprising a plurality of regulators individually connected to a respective OLED among the plurality of OLEDs.

3. The input voltage stabilization circuit according to claim 2, further comprising a diode AND gate comprising a plurality of diodes, wherein the plurality of diodes is individually connected to a respective connection node among a plurality of connection nodes between the plurality of OLEDs and the plurality of regulators.

4. The input voltage stabilization circuit according to claim 3, wherein the diode AND gate is configured to determine the maximum voltage value for the plurality of OLEDs by determining a maximum voltage among a plurality of voltages applied to the plurality of OLEDs.

5. The input voltage stabilization circuit according to claim 4, wherein the feedback unit comprises a voltage division resistor unit configured to:

divide a voltage output from the diode AND gate; and output a divided voltage as the information provided as feedback to the voltage converter.

6. The input voltage stabilization circuit according to claim 5, wherein the feedback unit further comprises a capacitor unit connected in parallel to the voltage division resistor unit.

7. The input voltage stabilization circuit according to claim 1, wherein the voltage converter is further configured to adjust the output voltage to maintain, at a reference value, the information provided as feedback to the voltage converter.

8. The input voltage stabilization circuit according to claim 1, wherein the converter protector further comprises a second output voltage unit configured to provide, as feedback to the voltage converter, information regarding a second limit voltage value for limiting the output voltage.

9. The input voltage stabilization circuit according to claim 1, wherein the first output voltage unit comprises the plurality of Negative Temperature Coefficient (NTC) thermistors arranged at the plurality of points of the circuit board.

10. The input voltage stabilization circuit according to claim 8, wherein the converter protector further comprises a diode OR gate configured to select a greater voltage value among a first voltage value output from the first output voltage unit and a second voltage value output from the second output voltage unit.

11. The input voltage stabilization circuit according to claim 1, further comprising a failure sensing unit configured to sense a failure in at least one of the plurality of OLEDs.

12. The input voltage stabilization circuit according to claim 1, further comprising at least one processor configured to control, for each of the plurality of OLEDs, a respective optical output pattern based on a Pulse Width Modulation (PWM) signal.

13. The input voltage stabilization circuit according to claim 12, further comprising a power sensing unit configured to sense an abnormal state of a power supply line that supplies power from the vehicle battery.

14. The input voltage stabilization circuit according to claim 13, further comprising an emergency power connection unit configured to supply a voltage for providing the PWM signal to the voltage converter.

* * * * *